United States Patent [19]

Hochman

[11] Patent Number: 5,838,685
[45] Date of Patent: Nov. 17, 1998

[54] METHOD AND APPARATUS FOR THE TRANSMISSION OF DATA FILES

[76] Inventor: Gary Hochman, 17 Windsor Dr., Muttontown, N.Y. 11753

[21] Appl. No.: 797,554

[22] Filed: Feb. 6, 1997

[51] Int. Cl.$^6$ .............................. H04J 3/24; H04Q 11/04
[52] U.S. Cl. .................. 370/428; 370/474; 340/825.52; 340/825.53
[58] Field of Search .................................... 370/428, 474; 340/825.52, 825.53

[56] References Cited

U.S. PATENT DOCUMENTS

| | | | |
|---|---|---|---|
| 5,173,900 | 12/1992 | Miller et al. | 370/474 |
| 5,304,992 | 4/1994 | Harashima | 340/825.52 |
| 5,333,135 | 7/1994 | Wendorf | 370/474 |
| 5,379,296 | 1/1995 | Johnson et al. | 370/474 |
| 5,627,997 | 5/1997 | Pearson et al. | 370/428 |
| 5,655,079 | 8/1997 | Hirasawa et al. | 340/825.53 |
| 5,675,507 | 10/1997 | Bobo, II | 364/514 R |
| 5,719,562 | 2/1998 | Fawcett | 340/825.53 |
| 5,726,640 | 3/1998 | Jones et al. | 370/428 |

Primary Examiner—Brian Zimmerman
Assistant Examiner—Edward Merz
Attorney, Agent, or Firm—Schweitzer Cornman Gross & Bondell LLP

[57] ABSTRACT

A method and apparatus for the transmission of data files over a network has particular application in connection with store-and-forward systems. A message transmission is composed using a chosen data format, which may be chosen from graphics, facsimile, audio, video or text file formats. A unique identifier code, corresponding to the data format, is annexed to the message file, and the unified transmission is sent to a reception host facility through the network. The reception facility stores the message, advising the particular recipient of its reception and the nature of the data, obtained upon inspection of the identifier code. Because the code is exterior to the message, the data format may be determined without examination of the message contents, such that the integrity and privacy of the message is maintained. The host facility may maintain a listing of the data formats accessible by recipients associated with the facility to allow an acknowledgement of reception capability to be forwarded to the sender.

7 Claims, 5 Drawing Sheets

METHOD AND APPARATUS FOR THE TRANSMISSION OF DATA FILES

The present invention relates to a new and improved methodology and apparatus for carrying out the transmission of a variety of types of data over data transmission networks and for the provision of store and forward capabilities to data, irrespective of its nature or format.

BACKGROUND OF THE INVENTION

Data communication networks are well known. Such networks may be of a local and private nature, connecting users in an office, plant or business enterprise, or may be of a more public nature, allowing large numbers of users, often unrelated other than by their ability to connect to the network, communication access to each other. The network known as the "Internet" is perhaps the best-known example of the latter type of network. Local, private networks themselves may be joined together. The term "internet" may be applied to describe such networks.

As is well known, the Internet comprises a diverse and widespread array of computers interconnected together to allow the transfer of data therebetween. Through Internet service providers, virtually anyone with a personal computer has the capability to communicate with any other computer user similarly connected.

Communications between network users utilize "store-and-forward" technology, often implemented and described as "electronic mail" or "E-mail" which allows text entered by a first user at a first location to be transmitted to a recipient at a second location. The "mailing" party merely identifies the intended recipient by his or her E-mail address. Established protocols for E-mail store-and-forward transmission and transfer through networks provide for identification of the recipient and his or her "mailbox", allowing the necessary routing to be accomplished. On the Internet, such routing may include transfer between various Internet service providers and intermediates, such that the E-mail message is received or posted at the designated location. Often, such location is in a particular memory area of a server computer on an intranet, or in a host computer maintained by an Internet service provider, such as America On Line. The intranet/Internet service provider arranges for a storage place for the incoming message, typically provides further facilities for a user of the service to be advised when he or she signs on to the system that an E-mail transmission has been received, and provides a methodology for the recipient to "read", copy, delete, print or otherwise handle the message as desired.

Another embodiment of store-and-forward technology is "voice mail", in which a telephone system or network include the ability for a transmitting party (the caller) to create a verbal or voice mail message which is transmitted to and stored in a voice mail mailbox, for subsequent access by the intended recipient.

There are, of course, numerous other types of data which may be transferred among and between computers or other devices on a network. For example, computers may include the necessary components and software to send and receive facsimile (fax) transmissions. Similarly, when properly configured and connected, other types of files, such as various graphic data formats, can be transmitted and received. In such instances, however, both the transmitting and receiving unit must be on and operating, and a direct communication link between the units established prior to transmission. Store-and-forward technology, as embodied in E-mail and voice mail, however, is substantially different. Store-and-forward systems replicate (conventional) mail services by which a data packet or file, corresponding to a "letter", can be sent to an intended recipient without the necessity of the recipient being "on line" and present and prepared to simultaneously accept the transmission. Rather, the transmission is received by a facility which maintains the communication in the manner of a "mailbox" making the contents thereof available to the intended recipient when the recipient poles or "checks" his or mailbox for the presence of "mail".

Present E-Mail and voice mail technology and systems are independent of each other, and limit their transmissions to text-type and voice data, respectively, providing no linkage between the data types. While in certain cases it may be possible to transmit another type of file as an "attachment" to an E-mail transmission, the data must be inspected during the transmission process to determine its type so that it can be handled and displayed properly. This inspection requirement raises significant security and privacy issues. Typically, such data is sent in other, conventional modes, wherein direct communication is established between the sender and recipient prior to, and for the duration of, the data transmission.

It is accordingly a purpose of the present invention to provide a methodology for the transmission of a variety of types of data through store-and-forward systems and as E-mail.

A further purpose of the present invention is to provide a methodology for the transmission of a variety of data types as E-mail, while maintaining the privacy of the data file transmitted.

Another purpose of the invention is to provide a methodology for store-and-forward data transfer which allows a sending party to determine whether a potential recipient has the capability for proper reception of a delivered message in the format contemplated by the sender.

Still another purpose of the present invention is to provide a methodology for E-mail-type transmissions which allow the transmission of E-mail messages to originate from facilities not directly coupled to an E-mail transmission network.

BRIEF DESCRIPTION OF THE INVENTION

In accordance with the foregoing and other objects and purposes, the methodology of the present invention comprises the affixation of an identifying indicia, such as an identification field to an intended E-mail transmission, the field identifying the nature of the data constituting the E-mail transmission. Preferably the indicia forms a part of a header transmission which may contain identifying data relating to both the sender and intended recipient. Upon initiation of the E-mail transmission, the header information allows the data processing elements in the transmission path between sender and recipient to identify the recipient, as well as the format of the data constituting the E-mail message, allowing the transmitted data to be properly handled throughout the transmission process. The data file is received and stored in an appropriate memory location by a host facility for subsequent retrieval by the identified recipient. For purposes of reception by the recipient, the storage facility, utilizing the header information, may post an appropriate message for the intended recipient, advising the recipient of the presence of an E-mail transmission and the nature or format of the transmission. So advised, the recipient can configure his reception equipment to properly process and/or display the E-mail transmission. Because the data type is set forth in a part of the E-mail transmission separate from the body of data transmitted, the E-mail body need not be examined. Thus, the security and privacy of the data is maintained.

The invention may further comprehend the use of additional indicia available to users of the transmission network to identify or characterize the reception capabilities of the E-mail subscribers. With such information available, a sender can inquire regarding the ability of the intended recipient to receive a transmission of the data type comprehended or, alternatively, the sender can be provided with a notification upon transmission that the intended transmission can or cannot be received by the recipient, allowing an alternative route or data format to be utilized.

BRIEF DESCRIPTION OF THE DRAWINGS

A fuller understanding of the present invention and the features and capabilities thereof will be achieved upon consideration of the following detailed description of illustrative embodiments of the invention, when reviewed in conjunction with the annexed drawings, wherein.

DETAILED DESCRIPTION OF THE INVENTION

Figure 1:
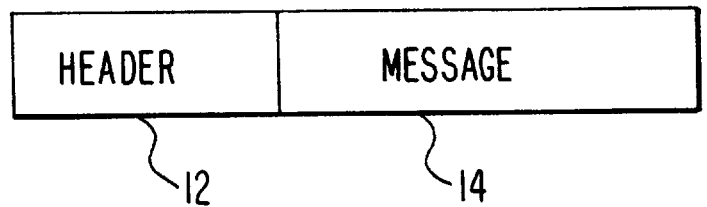
FIG. 1 is a diagrammatic representation of a conventional E-mail transmission.

In general, and as depicted in FIG. 1, a conventional store-and-forward E-mail transmission 10 includes a header portion 12 and a message or communication 14. While the transmission 10 may itself be "encapsulated" into another format for or during transmissions, the concept of a header apart from the message portion is integral to data delivery. The header 12 typically includes information to identify the recipient, the sender, as well as other information, such as a chosen title of the E-mail document, the time of transmission, etc. A known protocol, such as TCP/IP for Internet E-mail transmission, provides a predefined format for the header, providing the necessary information in a uniform format and allowing the E-mail message to be properly routed throughout the transmission process. Other generally equivalent header protocols may be used for E-mail transmissions in local and intranet networks.

Figure 2:
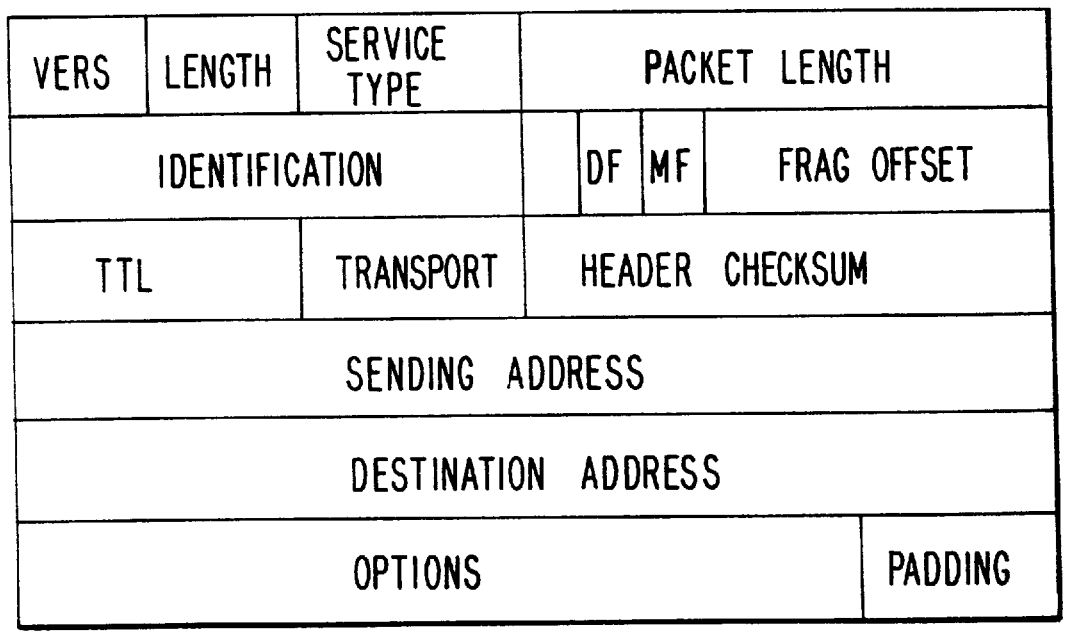
FIG. 2 is a diagrammatic representation of the header portion of an E-mail data transmission made in accordance with the present invention.

As shown in FIG. 2, the present invention incorporates the use of a header, which may otherwise be compatible with the conventional store-and-forward or E-mail transmission system with which it is employed, which includes a further header field which identifies the character of the E-mail message portion 14 with which the header is associated. FIG. 2, which is a representation of an TCP/IP header, is six 32-bit words long with all optional fields enabled. Its actual length depends on the data included therein. The shortest IP header is 20 bytes formed of 5 32-bit words. Included in the header are fields denoting both the sender's and the intended recipient's address. In a proposed embodiment, the recipient's address field may be modified to include a sub-field bearing the necessary identifier. For example, a "mail-type" sub-field may be a 1 byte character-width, located at the end of the recipient field, a particular letter or number associated with each potential E-mail body format, "a" representing a conventional text message; "b" representing a fax message; "c" an audio file, "d" a video clip file, etc. The field may be expanded to be delineated, for example, by a unique leading character, not otherwise used in that portion of the header, to assist in processing and identifying the field. Alternatively, a previously defined field may be modified to contain the information. For example, in an otherwise numeric field, the presence of alphabetic characters at a predefined location can denote the data type.

Figure 3:
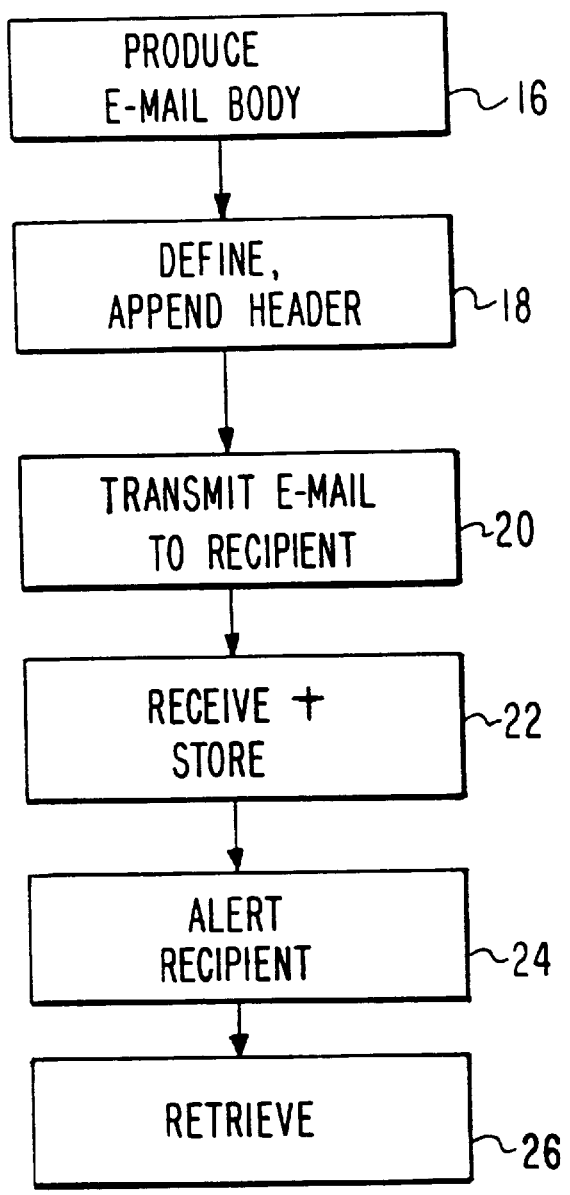
FIG. 3 is a flow diagram of the methodology of a first embodiment of the invention.

As depicted in FIG. 3, a first system utilizing methodology of the present invention operates as follows. The sender constructs an E-Mail message body at 16 in the desired format, whether as a facsimile image, conventional text, audio or video file or the like. At 18 conventional header material is entered, along with the appropriate coding to classify the type of E-mail body. As known in the art, this may be entered through a keyboard when the E-mail message is being composed at a personal computer having E-mail messaging software. The completed E-mail message is then transmitted at 20 through the network, such as the Internet, to which the sender is connected to a host recipient facility, typically the facility at which the intended recipient maintains an E-mail "mailbox". The message is routed using known methodology, the host recipient's identification, which is known through the address data for the actual intended recipient, being utilized as known in the art for message flow. Using the actual recipient's identification as set forth in the header, the E-mail transmission is received and stored at 22 by the reception facility, typically on a disk storage or other equivalent device.

When the recipient wishes to check his E-mail mailbox, he is advised at 24 that an E-mail transmission has been received and is available for accessing. The recipient is further advised as to the nature of the transmission, whether conventional text, fax, video, etc., the host facility utilizing the data in the mail-type field to make its determination. Because the type of transmission is set forth in the header, the reception facility need not process or inspect the message body. Thus, confidentiality and security of the message is maintained. With the recipient being advised of the presence of a transmission, the recipient retrieves or otherwise processes the message at 26, having configured his reception equipment as may be necessary to properly receive and view the transmitted message. Alternatively, the recipient may choose only to download and store the transmission for later use. In either event, however, the recipient is aware of the type of transmission so that it can be properly handled.

Figure 4:
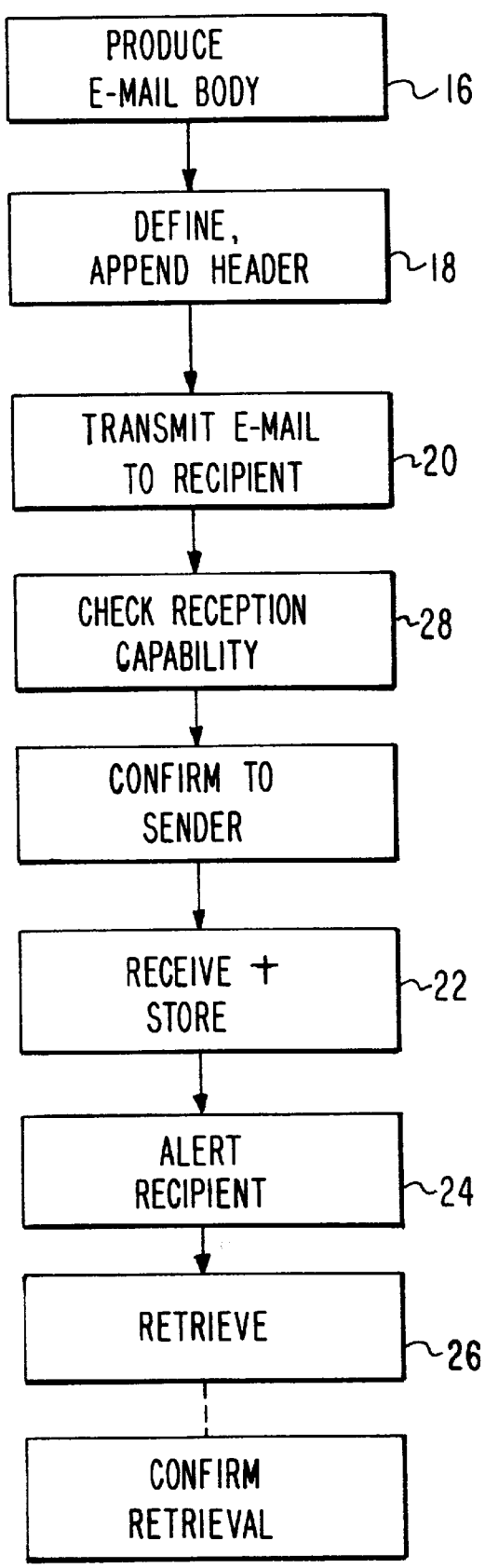
FIG. 4 is a flow diagram of the methodology of an alternative embodiment of the invention.

In an alternative embodiment of the methodology of the present invention, as set forth in FIG. 4, the reception facility contains a file of the specific reception capabilities of each of the mailbox holders. For example, data would be available that indicates that the recipient having address 140.54.11.77 has the capability to receive conventional and facsimile E-mail messages, while the recipient having address 140.54.87.33 has the capability to receive both facsimile and audio files. Accordingly, upon receipt of the transmitted data, the reception facility performs a check at 28 to confirm whether the message type identified in the header is compatible with the recipient's reception apparatus. With such check made, a confirmatory signal may be returned to the transmitting party. Alternatively, or additionally, upon retrieval by the recipient of the message, a further confirmatory signal may be transmitted back to the sender. Routines may be provided to process the data file to a format which can be handled by the recipient.

Figure 5:
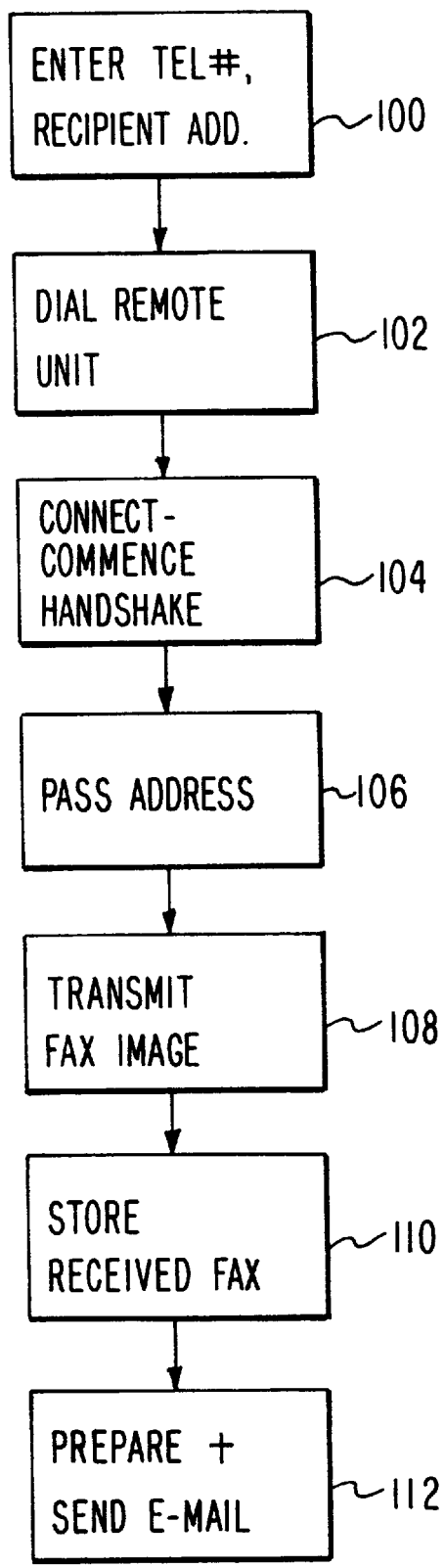
FIG. 5 is a flow diagram of the methodology of the present invention incorporating a transmission from a dedicated facsimile unit.

A further embodiment of the present invention is depicted in FIG. 5. In such an embodiment a sender not having a direct computer-based connection to a network, such as the Internet, may nonetheless utilize the network for the transmission of certain types of data. In such a case, exemplified in the Figure by the transmission of facsimile-encoded data from a sender having only a conventional facsimile unit, data fields which are transmitted to a header by the transmitting facsimile unit during the handshake protocols passing between facsimile units may be utilized to include the E-mail address of the intended recipient.

As depicted in the Figure, a sender wishing to send a facsimile store-and-forward message to an intended recipient mailbox directs his facsimile unit to connect to a receiving unit identified by its telephone number and the sub-address of the recipient is entered at 100 to allow it to be passed utilized by the facsimile reception equipment. For example, the TSI or Transmit Station Identifier handshake field may be modified to provide the E-mail address of the recipient. This field may be preferred as it does not, in a conventional facsimile transmission, provide delivery-crucial data. Alternatively, a shortened code may be utilized whereby, through appropriate lookups associated with the receiving apparatus at the reception facilities at the telephone number, may convert them to a form useable by the network system with which the recipient is associated. In either case, the sender enters the appropriate data into the facsimile unit where it becomes a part of the handshake data. This can be accomplished through appropriate software, data entry being performed, for example, through the dialing keypad of the facsimile unit. A transmission is then commenced, typically by the facsimile unit dialing the telephone number at 102 associated with a facsimile receiving unit located at a network facility. As known in the art, the transmitting and receiving facsimile units connect with each other and pass handshake data at 104 to configure the units for data transmission. The E-mail address is then transmitted at 106 as part of the handshake transmission, and can be identified and thus processed by the receiving unit.

The receiving unit, which may preferably be a facsimile data processor portion of a computer system, receives the facsimile transmission at 108 in a known manner and stores it as required at 110. From the address information retrieved from the handshake fields an E-mail transmission is prepared at 112, utilizing a header format of the present invention to denote the communication as being in facsimile format. Since the receiving unit associated with the dialed telephone number is a dedicated facsimile unit, the appropriate code for a facsimile E-mail transmission can be utilized without need to inspect the received facsimile transmission.

As yet a further alternative embodiment of the present invention, the header established for the transmission through the transmission network may serve to define an individual mailbox for a particular type of data intended for a particular recipient. In other words, Mr. Jones may maintain three related E-mail mailboxes at the host facility with which he is associated, each having a different address. The first mailbox is for "conventional" E-mail transmissions, a second mailbox would be for facsimile E-Mail transmissions, and a third for audio file transmissions. This may be of interest or value when, for example, access to particular types of transmissions are to be restricted to particular recipients. Once again, however, by incorporating an identifier as to the type of transmission in a header, appropriate routing can be performed without the necessity for any inspection of the data file itself, insuring integrity and confidentiality thereof.

Figure 6:
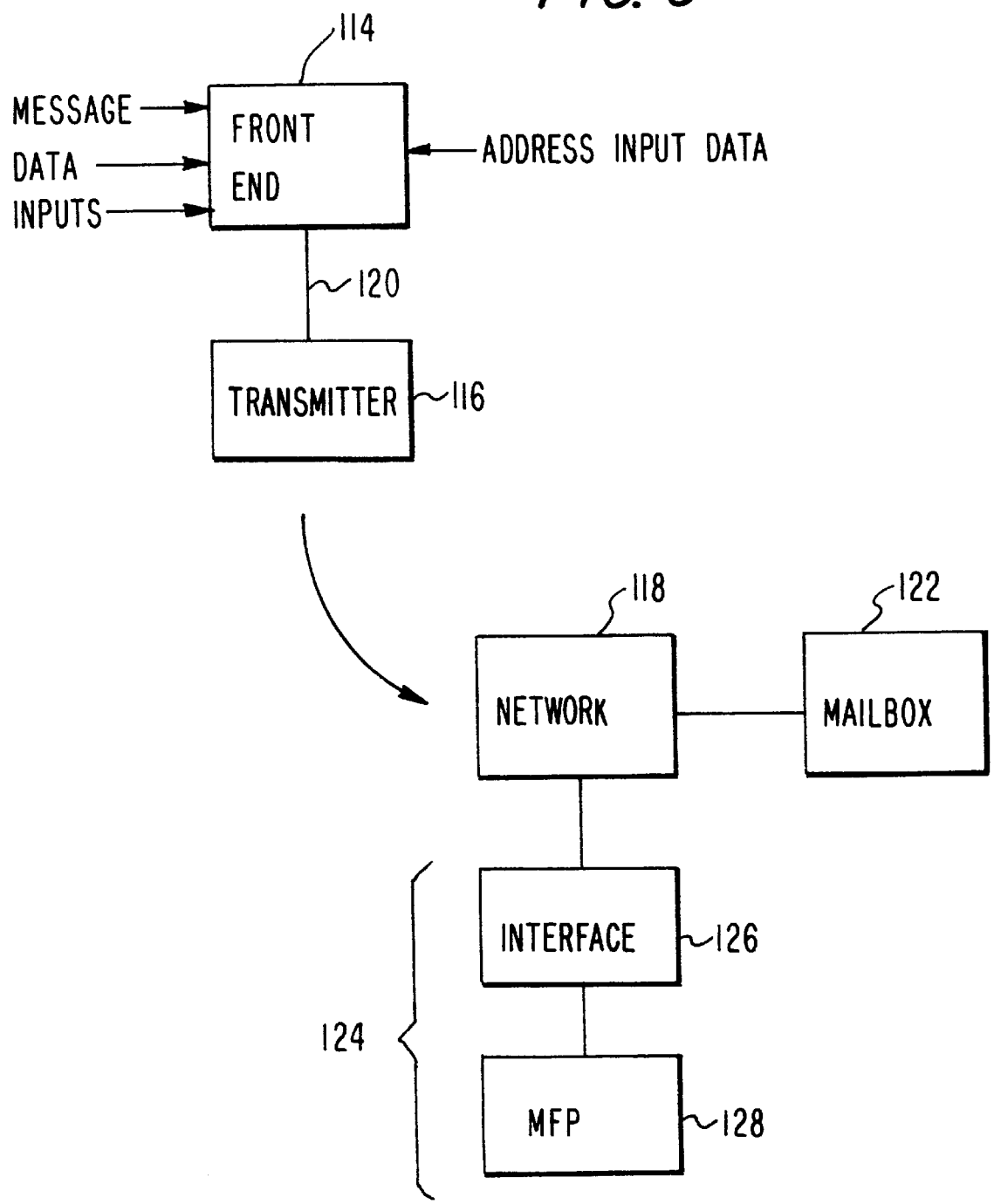
FIG. 6 is a block diagram of a multi-input data transmission system in accordance with the invention.

FIG. 6 depicts the format of a universal store-and-forward system in accordance with the present invention. Front end apparatus 114 may be a microprocessor-driven data-acquisition device, capable of accepting one or more input data types, whether in the form of text, audio or video signals, graphics files or any other contemplated format. It converts them to an appropriate digital format which can be transmitted over a network, such as the Internet or an intranet, and thus may include, by way of example, scanner or audio recorder circuitry.

The front end also accepts data representing the network address of the intended recipient. Contemplated data entry devices would include keyboard, keypads, and other input systems as known in the art. In a contemplated embodiment, the front end apparatus 114 may be a document scanner-type unit, having a 12-button telephone keypad to allow the entry of recipient address data. Other front end apparatus may be a PBX/telephony device or a personal computer running application software.

Front end 114 is coupled to transmitter 116, which serves as an input device to the network 118 over which a store-and-forward or E-mail transmission is to be made. Transmitter 116 receives the data file and recipient information from the front end, and assembles it into a network-compatible format, including a header having recipient and data-type information and a message portion. It is to be recognized that the transmission line 120 coupling the front end to the transmitter may be internal to an integrated device, may be a dedicated line, or may be a part of a communication system or network, such as the public telephone system. Transmitter 116 places the E-mail packet into the network, where it is routed as required to the mailbox 122 of the intended recipient. There it is accessed by the recipient in a known manner.

Alternatively, or additionally, the network 118 may be coupled to a multi-function product system 124, including a multi-function product 128 (MFP) having the capabilities to process a variety of data types, and capable of providing print, scan, facsimile, copy, duplex, and/or sort-and-staple functions. Multi-function product 128 may be an integrated unit, or may comprise discrete devices coupled together. Interface 126 comprises a receiver and processor for incoming store-and-forward messages, directing them to the appropriate facility in accordance with the type of message as identified in the transmission header. It may preferably include means for keeping track of the functions available through multi-function unit 128, whereby the capabilities of the system to properly process a particular store-and-forward transmission can be confirmed to a remote sender.

While the invention has been descried in connection with specific embodiments thereof, it is to be understood that it is capable of further modifications. Accordingly, the present application is intended to cover any variations, uses, or adaptations of the invention in accordance with the principles of the invention, including such modifications to the present disclosure as may fall within known practice within the art.

I claim:

1. A method for the integrated transmission of store-and-forward messages of varying data formats over a network, comprising the steps of:

composing a message body of an identified data format for an intended recipient;

annexing to said message body a unique identifier corresponding to the data format of the message body;

transmitting the identifier and message body through the network for reception by a host facility;

inspecting the identifier at the host facility to identify the data format of the message body; and advising the recipient of the receipt of the message and its data format.

2. The method of claim 1, wherein said identifier comprises a portion of a header.

3. The method of claim 1 further including the step of annexing to said message body a network address of the recipient.

4. The method of claim 3, wherein said identifier and said network address comprise portions of a header.

5. A method for the transmission of a store-and-forward message over a network comprising the steps of:

composing a data message of a chosen data type at a data entry device;

entering a network address for the intended recipient;

transmitting said message in the chosen data type and the identity of the recipient over a first communication channel to a network entry terminal;

forming a network compatible message having a message body comprising said message contents in the chosen data type and recipient and data type information exterior to said message body;

transmitting said network compatible message through the network to a host reception facility associated with the network address of the recipient; and storing said message and information relating to the data type for retrieval by the recipient.

6. The method of claim 5, wherein said data entry device is a document scanner, a PBX/telephony device, or a computer running application software.

7. A method for the integrated transmission of store-and-forward messages of varying data formats over a network from a sender to a recipient, comprising the steps of:

composing a message body of an identified data format for the recipient having a network address;

annexing to said message body a unique identifier corresponding to the data format of the message body;

maintaining on said network a listing of network addresses and the data reception capabilities thereof;

transmitting the identifier and message body through the network for reception by a host facility;

inspecting the identifier at the host facility to identify the data format of the message body;

confirming through inspection of said listing the capability of the recipient to properly receive the data format of the message body and, if confirmed, advising the recipient of the receipt of the message and its data format; and reporting to the sender of the status of the transmission.

\* \* \* \* \*